(12) United States Patent
Ho (10) Patent No.: US 11,746,253 B2
(45) Date of Patent: Sep. 5, 2023

(54) SPRAYABLE CONDUCTIVE AGENT CAPABLE OF FORMING CONDUCTIVE PORTION AND MANUFACTURING METHOD AND USE THEREOF

(71) Applicant: Hoi Ming Michael Ho, Tuen Mun (HK)

(72) Inventor: Hoi Ming Michael Ho, Tuen Mun (HK)

( * ) Notice: Subject to any disclaimer, the term of this patent is extended or adjusted under 35 U.S.C. 154(b) by 319 days.

(21) Appl. No.: 17/194,329

(22) Filed: Mar. 8, 2021

(65) Prior Publication Data

US 2022/0282110 A1  Sep. 8, 2022

(51) Int. Cl.
| | |
|---|---|
| *C09D 133/02* | (2006.01) |
| *A61K 9/00* | (2006.01) |
| *D06M 23/00* | (2006.01) |
| *D06M 13/148* | (2006.01) |
| *D06M 15/263* | (2006.01) |
| *C08K 3/22* | (2006.01) |
| *D06M 16/00* | (2006.01) |
| *D06M 11/38* | (2006.01) |
| *C08K 5/03* | (2006.01) |
| *C08K 5/053* | (2006.01) |
| *D06M 13/175* | (2006.01) |

(52) U.S. Cl.
CPC ........... *C09D 133/02* (2013.01); *C08K 3/22* (2013.01); *C08K 5/03* (2013.01); *C08K 5/053* (2013.01); *D06M 11/38* (2013.01); *D06M 13/148* (2013.01); *D06M 13/175* (2013.01); *D06M 15/263* (2013.01); *D06M 16/00* (2013.01); *D06M 23/00* (2013.01)

(58) Field of Classification Search
CPC ................................ C09D 133/02; A61K 9/00
See application file for complete search history.

(56) References Cited

U.S. PATENT DOCUMENTS

| 9,078,813 B2 * | 7/2015 | Kiser ................. A61M 31/002 |
| 9,176,487 B2 * | 11/2015 | Sperling ............. A61K 9/0014 |
| 10,342,840 B2 * | 7/2019 | Gutierrez ............... A61P 31/12 |
| 2012/0190661 A1 * | 7/2012 | Trogden ................. A61K 45/06 |
| | | 552/638 |

(Continued)

FOREIGN PATENT DOCUMENTS

| CA | 2599653 A1 * | 9/2006 |
| CN | 102580122 A * | 7/2012 |

OTHER PUBLICATIONS

EPlulse Conductive Spray Gel. https://epulsemassage.com/product/enovative-conductive-gel/. 2020 (Year: 2020).*

(Continued)

*Primary Examiner* — Cachet I Proctor
(74) *Attorney, Agent, or Firm* — CIPO IP Group (57) ABSTRACT

A conductive agent can be filled in a sprayer and sprayed onto the surface of a fabric to form a conductive portion thereon. The conductive agent includes sodium hydroxide, carbomer, glycerin, disinfectant and water. The percentage by weight of sodium hydroxide is 0.15% to 0.25% of the conductive agent; the percentage by weight of carbomer is 0.45% to 0.55% of the conductive agent; the percentage by weight of the glycerin is 0.90% to 1.10% of the conductive agent; the percentage by weight of disinfectant is 0.03% to 0.07% of the conductive agent.

4 Claims, 8 Drawing Sheets

(56) References Cited

U.S. PATENT DOCUMENTS

2012/0225147 A1* 9/2012 Hines .................. A61P 17/00
424/725

OTHER PUBLICATIONS

Inci Decoder.Bleu & Marine. Conductive Gel, Jan. 2019. https://incidecoder.com/products/bleu-marine-conductive-gel (Year: 2019).*

* cited by examiner

| Horizontal Distance : 5cm | Maximum Diameter(mm) | Weight(g) | Conductivity ($\mu S/cm$) |
|---|---|---|---|
| Spray 5 Times | 75 | 0.53 | 337 |
| Spray 10 Times | 75 | 1.12 | 340 |
| Spray 15 Times | 75 | 1.64 | 343 |
| Spray 19 Times | 75 | 2.15 | 345 |
| Spray 20 Times | 75 | 2.16 | 345 |

FIG. 4A

| Horizontal Distance : 10cm | Maximum Diameter(mm) | Weight(g) | Conductivity ($\mu$S/cm) |
|---|---|---|---|
| Spray 5 Times | 116 | 0.53 | 330 |
| Spray 10 Times | 116 | 1.12 | 333 |
| Spray 15 Times | 116 | 1.64 | 335 |
| Spray 27 Times | 116 | 3.19 | 344 |
| Spray 28 Times | 116 | 3.20 | 344 |

FIG. 4B

| Horizontal Distance : 15cm | Maximum Diameter(mm) | Weight(g) | Conductivity ($\mu$S/cm) |
|---|---|---|---|
| Spray 5 Times | 142 | 0.53 | 321 |
| Spray 10 Times | 142 | 1.12 | 325 |
| Spray 15 Times | 142 | 1.64 | 328 |
| Spray 35 Times | 142 | 3.75 | 344 |
| Spray 36 Times | 142 | 3.76 | 344 |

FIG. 4C

SPRAYABLE CONDUCTIVE AGENT CAPABLE OF FORMING CONDUCTIVE PORTION AND MANUFACTURING METHOD AND USE THEREOF

FIELD

The present disclosure relates to a conductive agent, and more particularly to a conductive agent that has a lower viscosity so that it can be filled into a sprayer and sprayed on the surface of a fabric or an article through the sprayer to form a conductive portion.

BACKGROUND

A traditional conductive gel serves as an adhesive that can have conductive properties after solidifying or drying. It is usually composed of a resin matrix (such as epoxy resin, polyimide resin, phenol resin, polyurethane, acrylic resin, etc.) mixed with conductive particles (such as gold, silver, iron, graphite particles, conductive compounds, etc.). The conduction of a traditional conductive gel may be based on two principles as follows. First, forming a conductive path through mutual contact between conductive particles. Second, forming a current path between the conductive particles through the tunneling effect.

The aforementioned two conduction principles are briefly discussed as follows. For the former, before a conductive gel is solidified or dried, conductive particles are separated from each other in the conductive gel. As the solvent in the conductive gel volatilizes and the resin solidifies, the volume of the conductive gel decreases, so that the conductive particles become close to and abutted on each other and enter into a stable continuous contact state. In this way, the solidified or dried conductive gel presents conductivity. For the latter, according to quantum mechanics, when the energy of a microscopic particle is less than the energy of a potential harrier, there is possibility that the particle passes through the potential harrier. As electrons is a kind of microscopic particle, when the thickness of the isolation layer between adjacent conductive particles in a conductive gel become small enough, the free electrons of the conductive particles can pass through the isolation layer (i.e., through the potential barrier), so that the isolation layer between the conductive particles becomes a conductive portion, and the solidified or dried conductive gel exhibits conductivity.

Further, conductive gels are usually applied to microelectronics assembly, for example, serving as wires, printed circuits, electroplating substrates, etc. In addition, some conductive gels may be adherable at low temperature, and therefore can replace tin-lead solder required for general conductive soldering. These conductive gels can also be applied to non-heat-resistant or non-solderable materials, such as plastics, ceramics, solid carbon, quartz, etc. Therefore, with the trend of miniaturing electronic products, light-emitting diodes (LEDs), integrated circuits (ICs) and large-scale hybrid integrated circuits (LSIs) used in electronic products such as microcomputers, touch keyboards, electroluminescent (EL) panels, etc., have mostly used conductive gels for electrical connection and fixation.

However, limited by their current uses, the viscosity of the conductive gels is relatively high, making these conductive gels unsuitable for spray coating. Therefore, how to effectively improve on the traditional conductive gels has become an important subject of the present disclosure.

SUMMARY

In response to the above-referenced higher viscosity of the conventional conductive gels, through years of practical experience in relevant research, testing, and improvement, a sprayable conductive agent capable of forming a conductive portion and the manufacturing method and use thereof are provided in the present disclosure, so as to overcome the above-referenced technical inadequacies to allow a conductive portion be formed by spraying.

One aspect of the present disclosure is directed to a conductive agent capable of being sprayed to form a conductive portion on a fabric or an article. The conductive agent includes sodium hydroxide having a percentage by weight of 0.15% to 0.25% of the conductive agent; carbomer having a percentage by weight of 0.45% to 0.55% of the conductive agent; glycerin having a percentage by weight of 0.90% to 1.10% of the conductive agent; disinfectant having a percentage by weight of 0.03% to 0.07% of the conductive agent; and water. The water may preferably be purified water, and in certain embodiments in which no ingredient other than those listed above is added in the conductive agent, the purified water accounts for the remaining percentage by weight of the conductive agent. The conductive agent has proper viscosity that allows it to be sprayable and to more conveniently form a conductive portion as compared to conventional conductive gels.

In certain embodiments, the disinfectant is triclosan.

In certain embodiments, the pH value of the conductive agent is neutral or substantially neutral.

In certain embodiments, the pH value of the conductive agent is 6.0 to 7.5.

Another aspect of the present disclosure is directed to a manufacturing method of a conductive agent capable of being sprayed to form a conductive portion and including carbomer, glycerin, sodium hydroxide, disinfectant and water. The method includes: dissolving carbomer and sodium hydroxide in water at a first temperature to form a first solution; stirring the first solution at a high speed for a first period to form a mixed second solution; adding glycerin and disinfectant to the mixed second solution at the first temperature to form a third solution; and stirring the third solution at a low speed and under vacuum until bubbles per unit volume of the third solution is lower than a minimum threshold to form the conductive agent. The water may preferably be purified water.

In certain embodiments, the first temperature is between 20° C. and 30° C.

In certain embodiments, the high speed is 30-40 revolutions per minute.

In certain embodiments, the first period is 25 minutes to 35 minutes.

In certain embodiments, the pH value of the mixed second solution is neutral or substantially neutral.

In certain embodiments, the disinfectant added is triclosan.

In certain embodiments, the pH value of the mixed second solution is 6.0 to 7.5.

In certain embodiments, the vacuum has an atmospheric pressure of or less than $1\times10^5$ Pascal.

In certain embodiments, the low speed is 20 to 30 revolutions per minute.

In certain embodiments, the manufacturing method includes adding the glycerin to the mixed second solution first, waiting for a second period, and adding the disinfectant to the mixed second solution after the second period.

In certain embodiments, the glycerin and the disinfectant are added to the mixed second solution at the same time.

In certain embodiments, the minimum threshold is determined by the conductivity value of the stirred third solution being 310 μS/cm.

Another aspect of the present disclosure is directed to a method of producing a conductive portion by using a conductive agent including sodium hydroxide having a percentage by weight of 0.15% to 0.25% of the conductive agent, carbomer having a percentage by weight of 0.45% to 0.55% of the conductive agent, glycerin having a percentage by weight of 0.90% to 1.10% of the conductive agent, disinfectant having a percentage by weight of 0.03% to 0.07% of the conductive agent, and water. The water may preferably be purified water, and in certain embodiments in which no ingredient other than those listed above is added in the conductive agent, the purified water accounts for the remaining percentage by weight of the conductive agent. The method includes: filling the conductive agent in a sprayer; spraying the conductive agent on a surface of a fabric or an article; and forming the conductive portion on the surface.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, materials, objects, or the like, which are for distinguishing one component/material/object from another one only, and are not intended to, nor should be construed to impose any substantive limitations on the components, materials, objects, or the like.

As used herein, the term "substantially" or "approximately" refers to, for example, a value, or an average of values, in an acceptable deviation range of a particular value recognized or decided by a person of ordinary skill in the art, taking into account any specific quantity of errors related to the measurement of the value that may resulted from limitations of a measurement system or device. For example, "substantially" may indicate that the value is within, for example, ±5%, ±3%, ±1%, ±0.5% or ±0.1%, or one or more standard deviations, of the particular value.

Traditionally, a method of providing an electrode layer on a fabric usually involves fixing a metal sheet on the fabric. Nevertheless, there is still room for improvement on the structure produced through such metal sheet fixation, and the conventional conductive gels have high viscosity and are difficult to be uniformly spread and applied on the fabrics. In response, the present disclosure is directed to directly providing an electrode layer on a fabric or an article, including but not limited to woven fabrics and non-woven fabrics/non-woven clothes, by using a conductive agent, so as to facilitate a user's subsequent use such as electrotherapy, and also directed to a conductive agent that can be sprayed to form a conductive portion and its manufacturing process and use.

Figure 1:
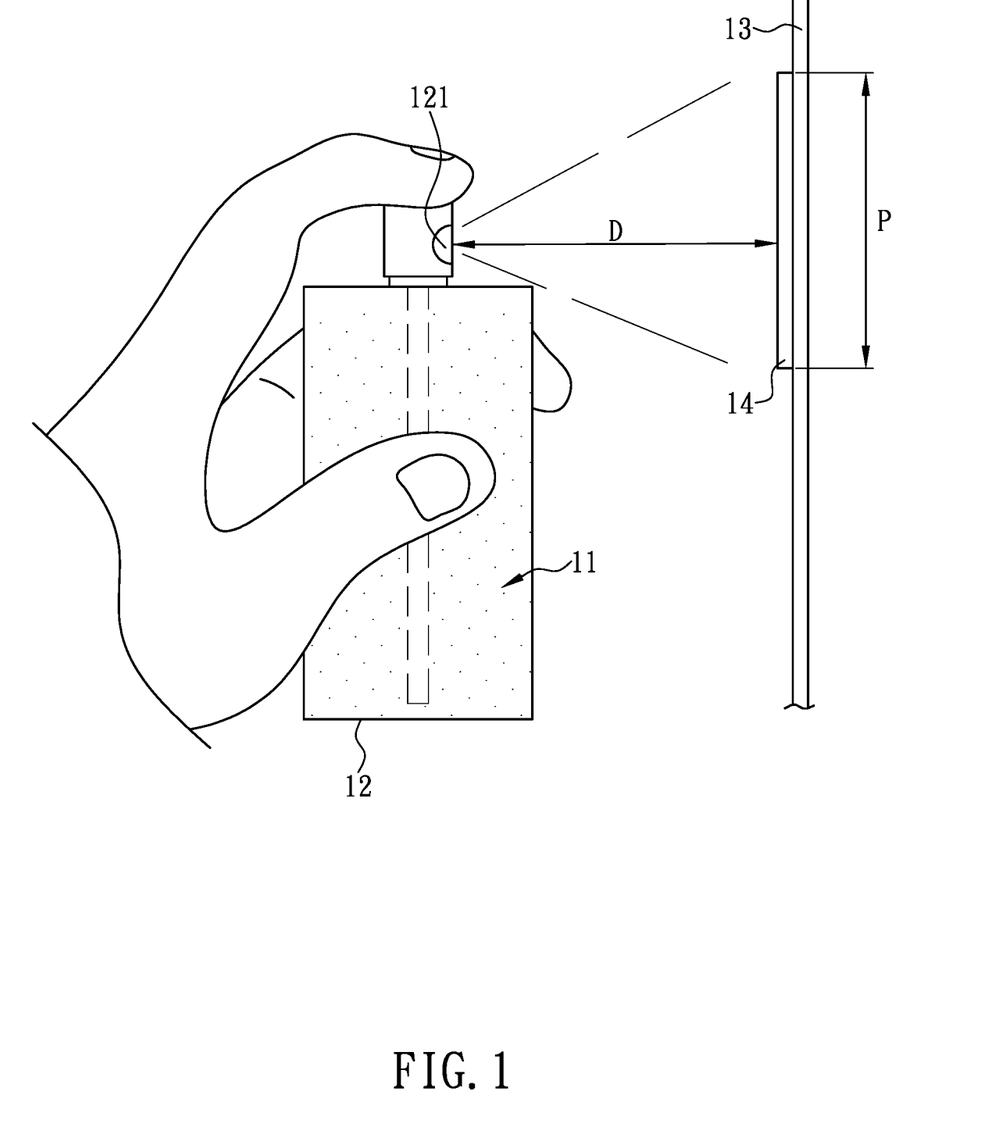
FIG. 1 is a schematic diagram showing a conductive agent according to the present disclosure being sprayed to form a conductive portion on a fabric or an article.

Referring to FIG. 1, in certain embodiments, the conductive agent 11 can be a conductive adhesive or conductive gel, and can be filled into a sprayer 12 (or a spray bottle) and be sprayed onto the surface of a fabric, skin or article 13 to form a conductive portion 14 on the surface of the fabric, skin or article 13. Accordingly, as long as a conductive wire is connected to the conductive portion 14, external power can be transmitted to the conductive portion 14 via the conductive wire. In certain embodiments, the article can be an electrode pad of an electrotherapy device such as a transcutaneous electrical nerve stimulator (TENS), an electrical muscle stimulation (EMS) device, etc, a metal electrode, a stainless electrode, a steel electrode, a carbon black electrode, a sticky silicone gel electrode, a fabric electrode, a sponge electrode, a cotton folded electrode, a disposable electrode, or a reusable electrode. However, the present disclosure is not limited thereto.

In order to ensure that the conductive agent 11 is sprayable, in certain embodiments, the conductive agent 11 includes sodium hydroxide, carbomer, glycerin, disinfectant and water. The water may preferably be purified water.

In certain embodiments, the percentage by weight of sodium hydroxide in the conductive agent 11 is 0.15% to 0.25%, and more preferably 0.19%-0.21%. As sodium hydroxide is an electrolyte, its dissolution in an aqueous solution produces OH⁻ anions (hydroxide ion), and enable the sodium hydroxide aqueous solution to conduct electricity. In addition, the sodium hydroxide can also undergo an alkaline neutralization reaction with carbomer, so that the pH value of the conductive agent 11 is neutral or substantially neutral.

Figure 2A:
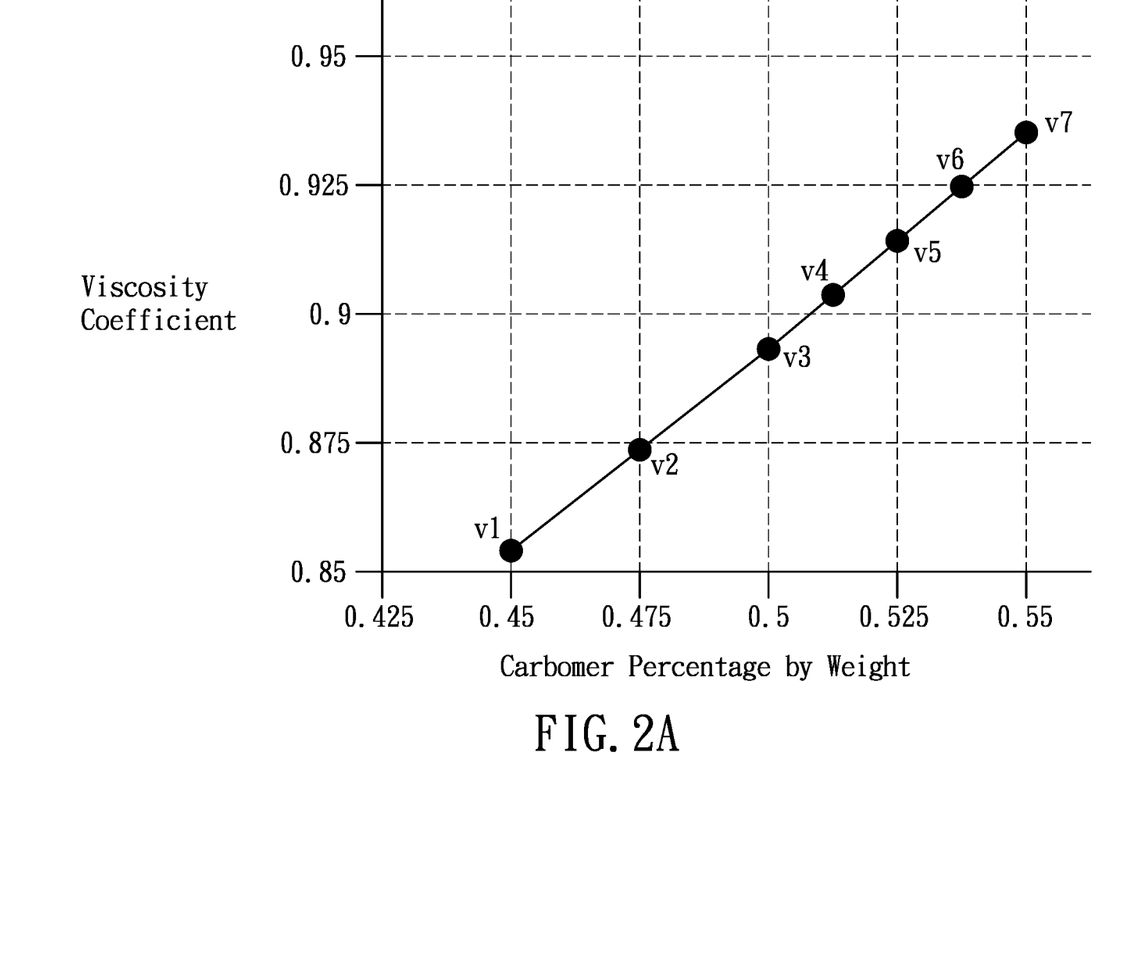
FIG. 2A is a coordinate chart showing the relationship between the percentage by weight of carbomer in the conductive agent to the conductive agent and viscosity coefficient of the conductive agent according to the experimental data of the present disclosure.

In certain embodiments, the percentage by weight of carbomer in the conductive agent 11 is 0.45% to 0.55%, and more preferably 0.49%-0.51%. Carbomer can react with sodium hydroxide for alkaline neutralization, and increase the viscosity of the conductive agent 11, so that the conductive agent 11 has sufficient viscosity to be attached to the fabric or article 13. Taking the percentage by weight of sodium hydroxide being 0.2% of the conductive agent 11 for example, referring to FIG. 2A, in which the X axis indicates percentage by weight of carbomer, and the Y axis indicates the viscosity coefficient of the conductive agent 11, when the percentage by weight of the carbomer increases from 0.45% to 0.55%, the viscosity coefficient of the conductive agent 11 increases from 0.8541 to 0.9352 Pas. The values of the percentage by weight of carbomer and viscosity coefficient corresponding to points v1 to v7 shown in FIG. 2A are detailed in Table 1 as follows.

TABLE 1

| Point Number | Percentage by Weight of Carbomer (%) | Viscosity Coefficient of Conductive Agent (Pa · s) |
| --- | --- | --- |
| v1 | 0.4500 | 0.8541 |
| v2 | 0.4750 | 0.8737 |
| v3 | 0.5000 | 0.8932 |
| v4 | 0.5125 | 0.9037 |
| v5 | 0.5250 | 0.9142 |
| v6 | 0.5375 | 0.9247 |
| v7 | 0.5500 | 0.9352 |

Figure 2B:
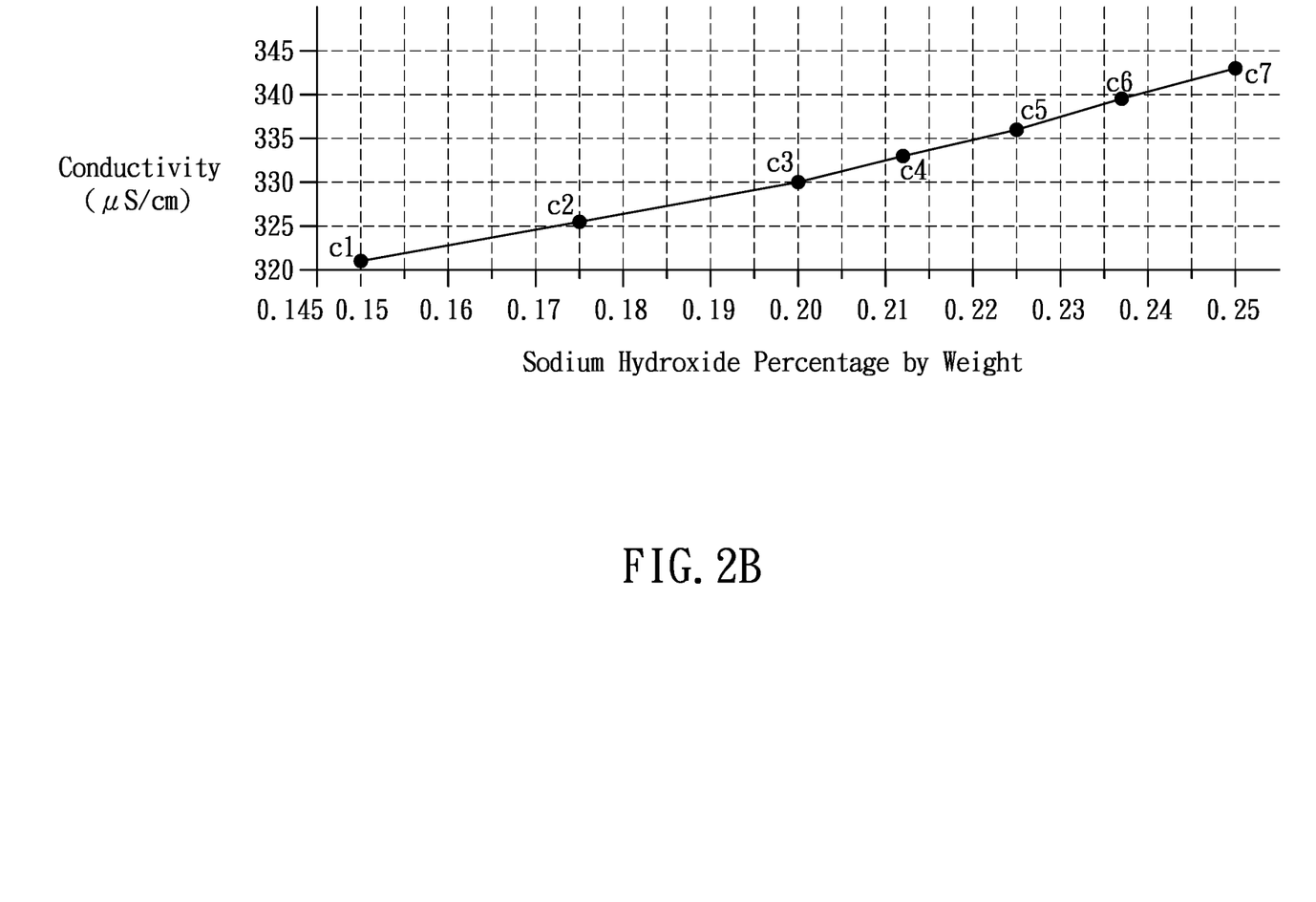
FIG. 2B is a coordinate chart showing the relationship between the percentage by weight of sodium hydroxide in the conductive agent to the conductive agent and the conductivity of the conductive agent according to the experimental data of the present disclosure.

Referring to FIG. 2B, in which the X axis indicates the percentage by weight of sodium hydroxide, and the Y axis indicates the electrical conductivity of the conductive agent 11, when the percentage by weight of the sodium hydroxide increases from 0.15% to 0.25%, the electrical conductivity of the conductive agent 11 increases from 321 μS/cm to 343 μS/cm. The values of the percentage by weight of sodium hydroxide and the electrical conductivity of the conductive agent corresponding to points c1 to c7 shown in FIG. 2B are detailed in Table 2 as follows.

TABLE 2

| Point Number | Percentage by Weight of Sodium Hydroxide (%) | Electrical Conductivity of Conductive Agent (μS/cm) |
| --- | --- | --- |
| c1 | 0.1500 | 321.00 |
| c2 | 0.1750 | 325.50 |
| c3 | 0.2000 | 330.00 |
| c4 | 0.2125 | 333.25 |
| c5 | 0.2250 | 336.50 |
| c6 | 0.2375 | 339.75 |
| c7 | 0.2500 | 343.00 |

Figure 2C:
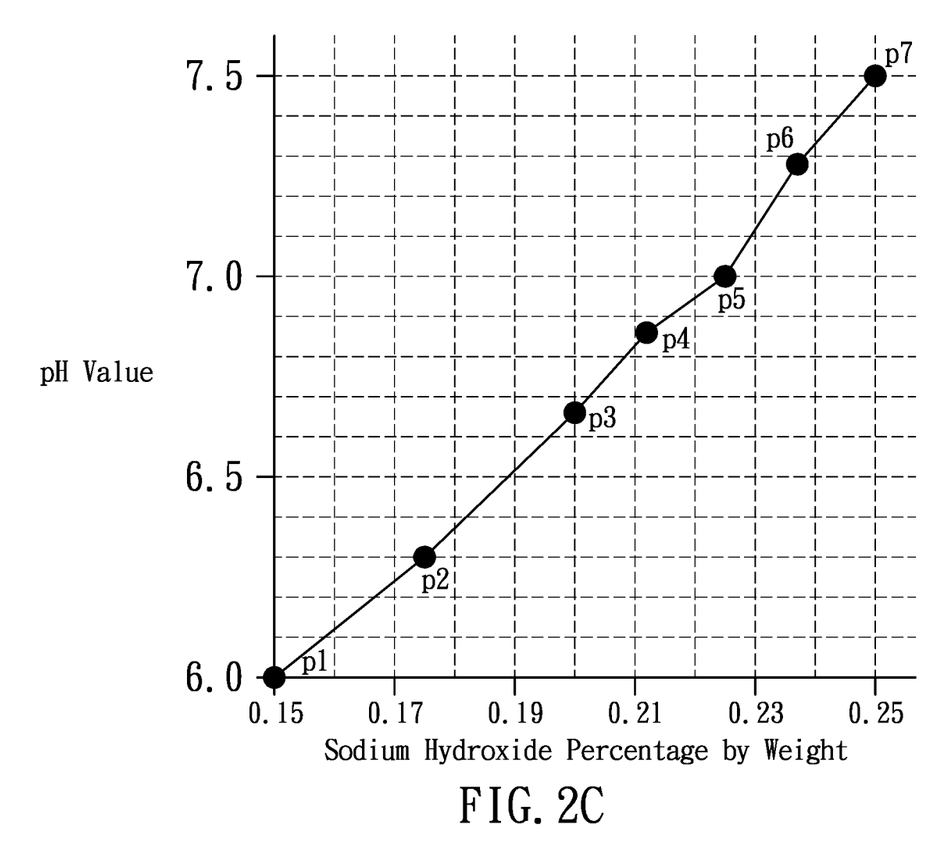
FIG. 2C is a coordinate chart showing the relationship between the percentage by weight of sodium hydroxide in the conductive agent to the conductive agent and the pH value of the conductive agent according to the experimental data of the present disclosure.

Referring to FIG. 2C, in which the X axis indicates percentage by weight of sodium hydroxide, and the Y axis indicates the pH value of the conductive agent 11, when the percentage by weight of sodium hydroxide increases from 0.15% to 0.25%, the pH value of the conductive agent 11 increases from 6.0 to 7.5. The values of the percentage by weight of sodium hydroxide and the pH value of the conductive agent 11 corresponding to points p1 to p7 shown in FIG. 2C are detailed in Table 3 as follows.

TABLE 3

| Point Number | Percentage by Weight of Sodium Hydroxide (%) | pH value of Conductive Agent |
| --- | --- | --- |
| p1 | 0.1500 | 6.000 |
| p2 | 0.1750 | 6.325 |
| p3 | 0.2000 | 6.650 |
| p4 | 0.2125 | 6.863 |
| p5 | 0.2250 | 7.075 |
| p6 | 0.2375 | 7.288 |
| p7 | 0.2500 | 7.500 |

Moreover, when the percentage by weight of carbomer is 0.5%, the pH value of the conductive agent 11 is substantially neutral, with a pH value of 6.65, and the conductive agent 11 has better viscosity, with its viscosity coefficient being 0.8932 Pa·s and the conductivity value being 330 μS/cm. Within the above-referenced value ranges, the conductive agent 11 can be sprayed out through the nozzle 121 of the sprayer 12, and also be stably attached to the fabric or article 13 to form a conductive portion 14 that is required for electrotherapy treatment. It is noted that if the percentage by weight of carbomer reaches 3%, the conductive agent 11 becomes too viscous, and can become hardly sprayable through a sprayer 12, for example, a market available bottle sprayer, having a spraying pressure of 1 bar.

In certain embodiments, the percentage by weight of glycerin in the conductive agent 11 is from 0.90% to 1.10%. Glycerin has the effects of enhancing the moisturization and lubrication properties of the conductive agent 11 and can isolate the conductive agent 11 from air, which therefore prevents the conductive agent 11 from oxidation and prolongs the service life of the conductive agent 11. The percentage by weight of disinfectant in the conductive agent 11 can be from 0.03% to 0.07%. The principle effect of disinfectant is to inhibit bacteria growth and mildewing. In certain embodiments, the disinfectant can be triclosan. However, the present disclosure is not limited thereto, and as long as a material has the effect of inhibiting bacteria growth or mildewing, it can serve as the disinfectant according to the present disclosure.

Further, in certain embodiments in which no ingredient other than those listed above is added in the conductive agent, the percentage by weight of purified water in the conductive agent 11 accounts for the remaining percentage by weight (in certain embodiments, approximately 98% or more) of the conductive agent 11. Purified water dissolves sodium hydroxide, enables the conductive agent 11 to have a conductive property, and enables the sodium hydroxide and carbomer to undergo an alkaline neutralization reaction, so that the pH value of the conductive agent 11 is neutral or substantially neutral.

Figure 3:
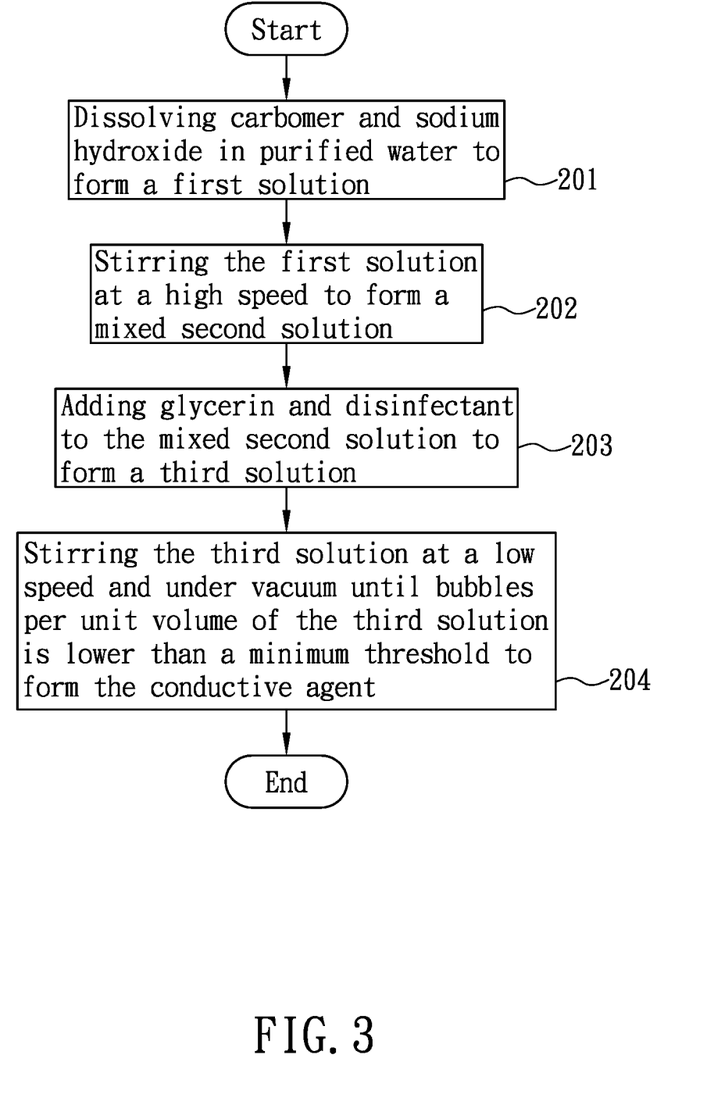
FIG. 3 is a flowchart of a manufacturing method of the conductive agent according to the present disclosure.

A further aspect of the present disclosure is directed to a manufacturing method of the conductive agent 11. Referring to FIGS. 1 and 3, in step 201, carbomer and sodium hydroxide are dissolved in water at a first temperature to form a first solution. The water may preferably be purified water. The first temperature can be room temperature, and can be between 20.0° C. to 30.0° C., preferably 24.5-25.5° C. In step 202, the first solution is stirred at a high speed for a first period to form a mixed second solution. The pH value of the mixed second solution is neutral or substantially neutral, or from 6.0 to 7.5. The high speed for the stirring can be 30-40 revolutions per minute (r/min), preferably 33-37 r/min. The first period can be 25 minutes to 35 minutes, preferably 28-32 minutes. In step 203, glycerin and disinfectant are added, at the first temperature, to the mixed second solution to form a third solution.

In step 203, in certain embodiments, both the glycerin and the disinfectant can be added to the mixed second solution at the same time. In certain embodiments, glycerin can be added to the mixed second solution first, and a second period (for example, 3 to 10 seconds, preferably 4-7 seconds) is waited before adding the disinfectant. In certain embodiments, the volume ratio of the added glycerin to the added disinfectant can be 21.00-23.00, and more preferably 21.90-22.10, and more preferably 21.98-22.06; and the weight ratio of the added glycerin to the added disinfectant can be 21.00-23.00, and more preferably 21.90-22.10, and more preferably 21.98-22.06.

In step 204, the third solution is stirred at a low speed and under vacuum until bubbles per unit volume of the stirred third solution is lower than a minimum threshold to form the conductive agent 11. As the conductivity of the stirred third solution increases when the number of bubbles per unit volume of the stirred third solution decreases, and the conductivity of the stirred third solution decreases when the number of bubbles per unit volume of the stirred third solution increases, a minimum threshold of the number of bubbles per unit volume of the stirred third solution can be determined by measuring the conductivity value of the stirred third solution. In certain embodiments, the minimum threshold can be determined by a conductivity value of the stirred third solution being 310 µS/cm or higher. In certain embodiments, the minimum-threshold determining conductivity value of the stirred third solution is 330 µS/cm or higher. In certain embodiments, the above-referenced vacuum has an atmospheric pressure below $1 \times 10^5$ Pascal, and the low speed is 20-30 r/min.

Accordingly, through the manufacturing method according to the present disclosure, the viscosity coefficient of the conductive agent 11 is not too high so as to allow it to be filled into the sprayer 12 and sprayed onto the surface of the fabric or article 13 through the nozzle 121 to form the conductive portion 14.

In summary, compared to a conventional manufacturing method of a conductive part (for example, fixing a metal sheet or other conductive materials to a fabric), the conductive agent 11 according to the present disclosure can be directly sprayed on a predetermined position of a fabric or an article to directly form a conductive portion 14 that is required by a user. Therefore, the method of manufacturing the conductive portion 14 through the conductive agent 11 according to the present disclosure is evidently more efficient and more convenient.

With the balanced viscosity of the conductive agent 11 according to the present disclosure, the conductive portion 14 formed by directly spraying the conductive agent 11 on the fabric or article 13 can have a coverage as described as follows. The conductive agent 11 is first filled in the sprayer 12. Referring to FIG. 1, the nozzle 121 is spaced from the surface of the fabric or article 13 by a distance D. Then, the conductive agent 11 is sprayed by the sprayer 12 to allow the conductive agent 11 having a weight that can be predetermined by a user based on the model, mechanism and the spraying times of the nozzle 121 to be attached to the fabric or article 13. As the conductive agent 11 spreads out when sprayed, the conductive portion 14 can be formed with a larger coverage.

Figure 4A:
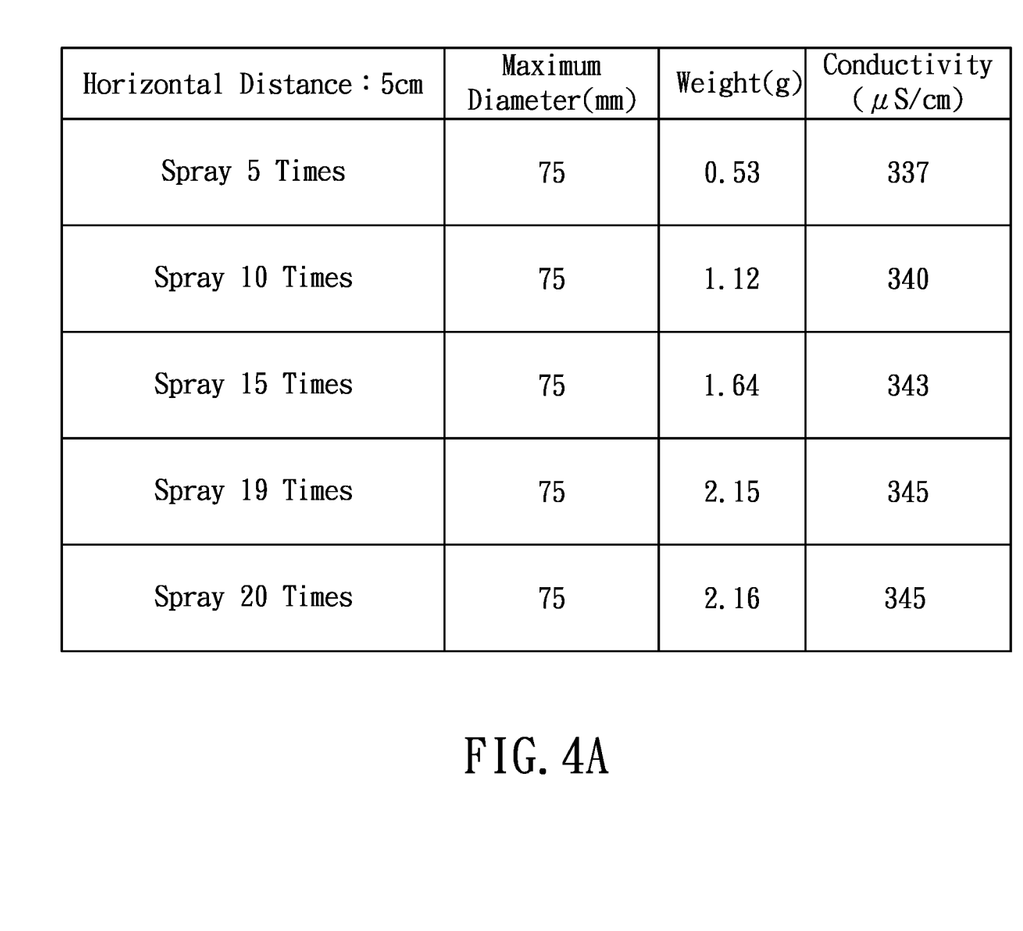
FIG. 4A is a chart showing the spraying coverage, weight, and conductivity values of a conductive portion formed by the conductive agent on a fabric or article with different spraying times at the same 5 cm distance between the fabric or article and a sprayer nozzle from which the conductive agent is sprayed according to the experimental data of the present disclosure.

Referring to FIG. 4A, with a nozzle 121 having a spraying pressure of 1 bar, electrical conductivity being tested by contacting a Suwei model SW-301 conductivity meter respectively with the conductive portions formed as described infra, and the sprayed article being nylon fabric, when the distance D is 5 cm and the spraying times of the sprayer 12 are 5 times, the conductive agent 11 covers a portion of the surface of the fabric or article 13 to form a conductive portion 14 with a maximum diameter P of 75 millimeters (mm), the weight of the conductive agent 11 forming the conductive portion 14 is 0.53 grams, and the electrical conductivity of the conductive portion 14 is 337 µS/cm; when the spraying times of the sprayer 12 are 10 times, the conductive portion 14 formed has a maximum diameter P of 75 mm, the weight of the conductive agent 11 forming the conductive portion 14 is 1.12 grams, and the electrical conductivity of the conductive portion 14 is 340 µS/cm; when the spraying times of the sprayer 12 are 15 times, the conductive portion 14 formed has a maximum diameter P of 75 mm, the weight of the conductive agent 11 forming the conductive portion 14 is 1.64 grams, and the electrical conductivity of the conductive portion 14 is 343 µS/cm; when the spraying times of the sprayer 12 are 19 times, the conductive portion 14 formed has a maximum diameter P of 75 mm, the weight of the conductive agent 11 forming the conductive portion 14 is 2.15 grams, and the electrical conductivity of the conductive portion 14 is 345 µS/cm; and when the spraying times of the sprayer 12 are 20 times, the conductive portion 14 formed has a maximum diameter P of 75 mm, the weight of the conductive agent 11 forming the conductive portion 14 is 2.16 grams, and the electrical conductivity of the conductive portion 14 is 345 µS/cm. That is, with the distance D being 5 cm, a maximum electrical conductivity of 345 µS/cm of the conductive portion 14 can be reached with 19 spraying times.

Figure 4B:
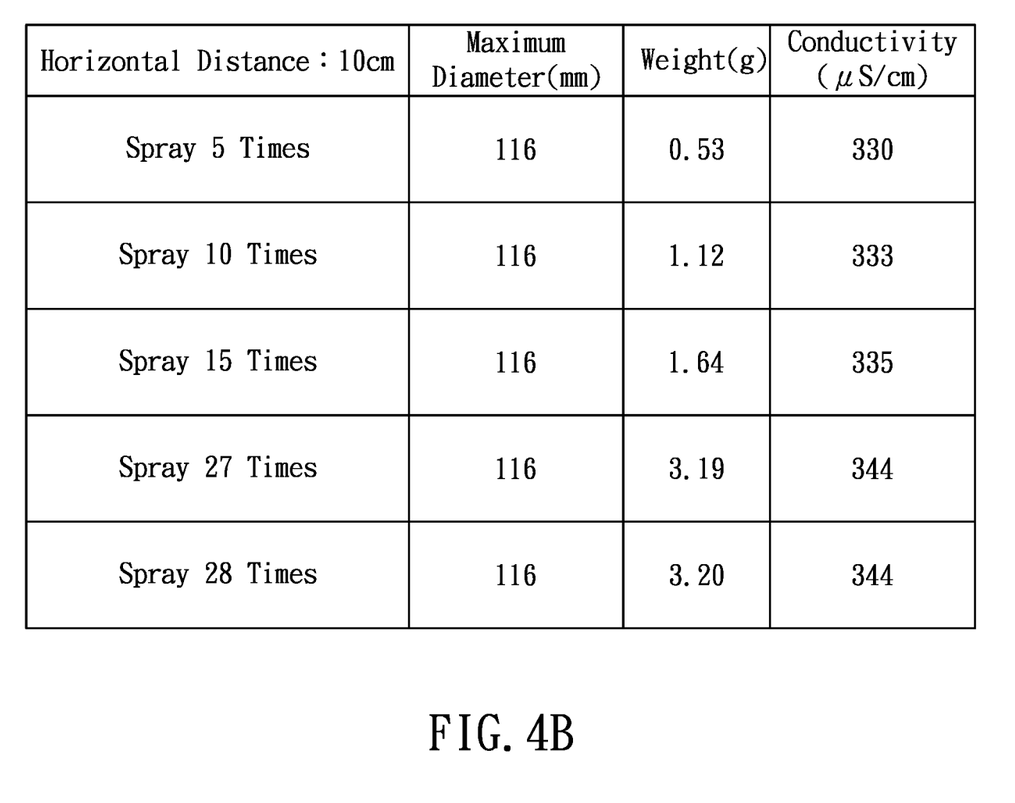
FIG. 4B is a chart showing the spraying coverage, weight, and conductivity values of a conductive portion formed by the conductive agent on a fabric or article with different spraying times at the same 10 cm distance between the fabric or article and a sprayer nozzle from which the conductive agent is sprayed according to the experimental data of the present disclosure.

Referring to FIG. 4B, with a nozzle 121 having a spraying pressure of 1 bar, electrical conductivity being tested by contacting a Suwei model SW-301 conductivity meter respectively with the conductive portions formed as described infra, and the sprayed article being nylon fabric, when the distance D is 10 cm and the spraying times of the sprayer 12 are 5 times, the conductive agent 11 covers a portion of the surface of the fabric or article 13 to form a conductive portion 14 with a maximum diameter P of 116 mm, the weight of the conductive agent 11 forming the conductive portion 14 is 0.53 grams, and the electrical conductivity of the conductive portion 14 is 330 µS/cm; when the spraying times of the sprayer 12 are 10 times, the conductive portion 14 formed has a maximum diameter P of 116 mm, the weight of the conductive agent 11 forming the conductive portion 14 is 1.12 grams, and the electrical conductivity of conductive portion 14 is 333 µS/cm; when the spraying times of the sprayer 12 are 15 times, the conductive portion 14 formed has a maximum diameter P of 116 mm, the weight of the conductive agent 11 forming the conductive portion 14 is 1.64 grams, and the electrical conductivity of the conductive portion 14 is 335 µS/cm; when the spraying times of the sprayer 12 are 27 times, the conductive portion 14 formed has a maximum diameter P of 116 mm, the weight of the conductive agent 11 forming the conductive portion 14 is 3.19 grams, and the electrical conductivity of the conductive portion 14 is 344 µS/cm; and when the spraying times of the sprayer 12 are 28 times, the conductive portion 14 formed has a maximum diameter P of 116 mm, the weight of the conductive agent 11 forming the conductive portion 14 is 3.20 grams, and the electrical conductivity of the conductive portion 14 is 344 µS/cm. That is, with the distance D being 10 cm, a maximum electrical conductivity of 344 µS/cm of the conductive portion 14 can be reached with 27 spraying times.

Figure 4C:
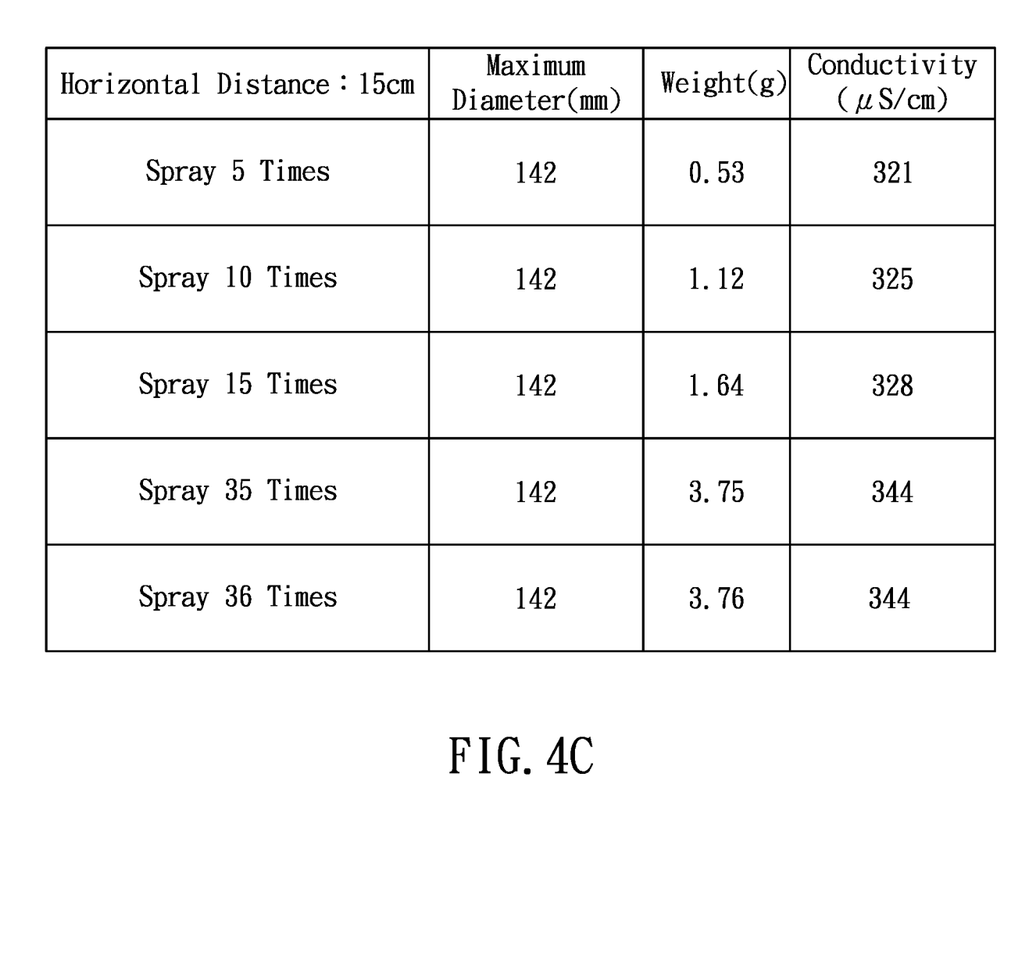
FIG. 4C is a chart showing the spraying coverage, weight, and conductivity values of a conductive portion formed by the conductive agent on a fabric or article with different spraying times at the same 15 cm distance between the fabric or article and a sprayer nozzle from which the conductive agent is sprayed according to the experimental data of the present disclosure.

Referring to FIG. 4C, with a nozzle 121 having a spraying pressure of 1 bar, electrical conductivity being tested by contacting a Suwei model SW-301 conductivity meter respectively with the conductive portions formed as described infra, and the sprayed article being nylon fabric, when the distance D is 15 cm and the spraying times of the sprayer 12 are 5 times, the conductive agent 11 covers a portion of the surface of the fabric or article 13 to form a conductive portion 14 with a maximum diameter P of 142 mm, the weight of the conductive agent 11 forming the conductive portion 14 is 0.53 grams, and the electrical conductivity of the conductive portion 14 is 321 µS/cm; when the spraying times of the sprayer 12 are 10 times, the conductive portion 14 formed has a maximum diameter P of 142 mm, the weight of the conductive agent 11 forming the conductive portion 14 is 1.12 grams, and the electrical conductivity of the conductive portion 14 is 325 µS/cm; when the spraying times of the sprayer 12 are 15 times, the conductive portion 14 formed has a maximum diameter P of 142 mm, the weight of the conductive agent 11 forming the conductive portion 14 is 1.64 grams, and the electrical conductivity of the conductive portion 14 is 328 µS/cm; when the spraying times of the sprayer 12 are 35 times, the conductive portion 14 formed has a maximum diameter P of 142 mm, the weight of the conductive agent 11 forming the conductive portion 14 is 3.75 grams, and the electrical conductivity of the conductive portion 14 is 344 µS/cm; and when the spraying times of the sprayer 12 are 36 times, the conductive portion 14 formed has a maximum diameter P of 142 mm, the weight of the conductive agent 11 forming the conductive portion 14 is 3.76 grams, and the electrical conductivity of the conductive portion 14 is 344 µS/cm. That is, with the distance D being 15 cm, a maximum electrical conductivity of 344 µS/cm of the conductive portion 14 can be reached with 35 spraying times.

Accordingly, as shown in FIGS. 4A-4C, the coverage and conductivity of the conductive portion 14 can be adjusted by a user by merely changing the distance D between the nozzle 121 and the fabric or article 13 and the spraying times of the conductive agent 11. The operation time taken by using the conductive agent 11 according to the present disclosure is evidently shorter than the time taken for manufacturing a conventional conductive part.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A conductive agent configured to be sprayed to form a conductive portion on a fabric or an article, comprising:
    sodium hydroxide, having a percentage by weight of 0.15% to 0.25% of the conductive agent;
    carbomer, having a percentage by weight of 0.45% to 0.55% of the conductive agent;
    glycerin, having a percentage by weight of 0.90% to 1.10% of the conductive agent;
    disinfectant, having a percentage by weight of 0.03% to 0.07% of the conductive agent; and
    water.

2. The conductive agent according to claim 1, wherein the disinfectant is triclosan.

3. The conductive agent according to claim 1, wherein a pH value of the conductive agent is neutral or substantially neutral.

4. The conductive agent according to claim 1, wherein a pH value of the conductive agent is 6.0 to 7.5.

* * * * *